J. TOREN.
ANTISKIDDING DEVICE.
APPLICATION FILED APR. 21, 1911.
1,011,277.
Patented Dec. 12, 1911.
3 SHEETS—SHEET 2.
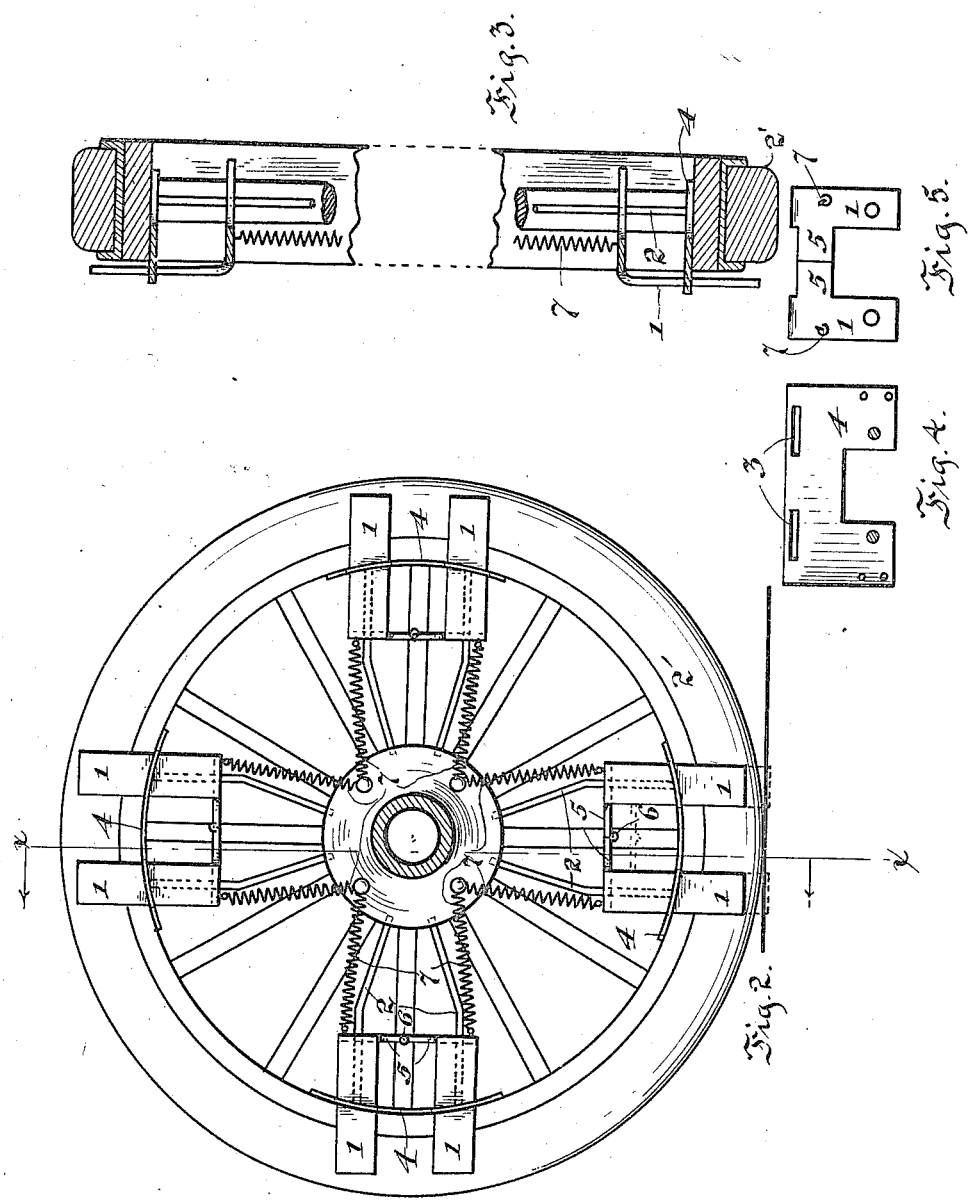
Witnesses
W. C. Smith
B. G. Richards
Inventor
Joseph Toren
by Joshua R. H. Toren
his Attorney

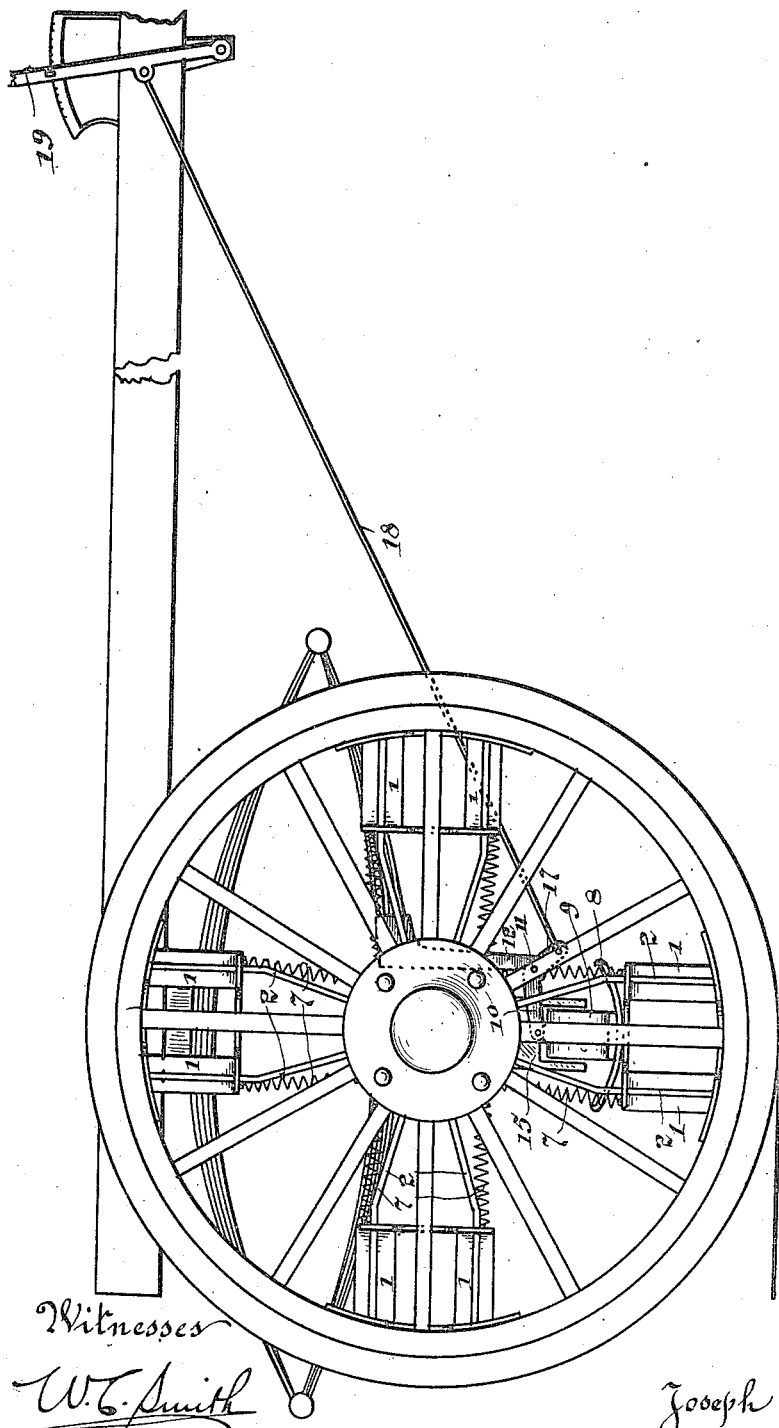

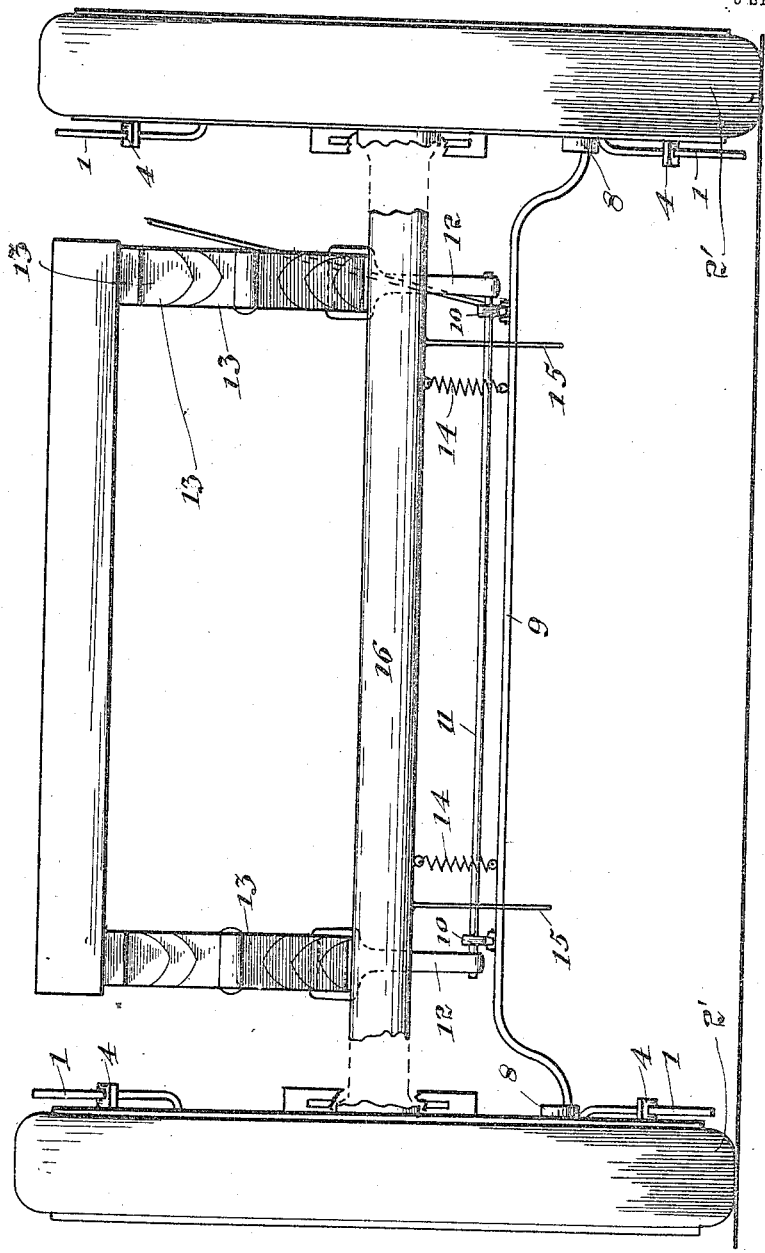

UNITED STATES PATENT OFFICE.

JOSEPH TOREN, OF THORNTON, ILLINOIS.

ANTISKIDDING DEVICE.

1,011,277.   Specification of Letters Patent.   Patented Dec. 12, 1911.

Application filed April 21, 1911. Serial No. 622,575.

*To all whom it may concern:*

Be it known that I, JOSEPH TOREN, a citizen of the United States, and a resident of the city of Thornton, county of Cook, and State of Illinois, have invented certain new and useful Improvements in Antiskidding Devices, of which the following is a specification.

My invention relates to improvements in anti-skidding devices especially adapted for use on motor trucks and has for its object the provision of a device of this nature which shall be of simple construction and efficient in operation.

The invention consists in the combination and arrangement of parts hereinafter described and claimed.

The invention will be best understood by reference to the accompanying drawings forming a part of this specification, and in which, Figure 1 is a side elevation of a motor truck wheel and a portion of the motor truck showing my invention applied thereto, Fig. 2 is an interior elevation of a wheel showing the mounting of the ground engaging dogs, Fig. 3 is a partial section of a wheel taken on line x—x of Fig. 2, Fig. 4, a detail plan view of one of the guide plates employed on the wheel, Fig. 5 a detail plan view of one of the ground engaging dogs employed, and Fig. 6, a rear elevation of the wheels and a portion of the truck provided with my improvement.

The preferred form of construction as illustrated in the drawings comprises angular ground engaging dogs 1 mounted to slide radially on guide rods 2 arranged between certain of the spokes of the wheels 2'. The dogs 1 pass through perforations 3 provided in guide plates 4 secured to the inner side of the wheel rim. The dogs 1 are provided with lateral extensions 5 which are hingedly connected together in pairs as shown and indicated by hinges 6. A spring 7 is secured to each of the dogs 1 and to the hub of the wheel and serves to hold said dogs normally in retracted positions. Cam shoes 8 are mounted in position to contact with the inner ends of dogs 1 as the wheel revolves and force said dogs into contact with the ground. These cam shoes are carried by an operating bar 9 which is pivotally suspended on arms 10 rigidly connected to a shaft 11 extending transversely of the body of the vehicle and mounted in hangers 12 detachably connected to springs 13 of the vehicle. Bar 9 is yieldingly held in position by means of springs 14 and slides vertically in suitable guides 15 carried by the axle 16 of the vehicle. Shaft 11 carries an oscillating arm 17 connected by means of a rod or other suitable element 18 with an operating lever 19 mounted on the vehicle in a convenient position for operation by the driver.

In use when it is desired to throw the dogs 1 into engagement with the ground to prevent skidding operating lever 19 is thrown forwardly by the driver. This serves to oscillate shaft 11 to depress the bar 9 and thus throw the cam shoes 8 into the path of the inner ends of the dogs 1 so that said dogs will be forced into contact with the ground as they pass said cam shoes. When the pair of dogs passes the cam shoes, spring 7 retracts them into inoperative positions. This construction will be found to be simple and highly efficient.

While I have illustrated and described the preferred construction for carrying my invention into effect, this is capable of variation and modification without departing from the spirit of the invention. I, therefore, do not wish to be limited to the exact details of construction set forth, but desire to avail myself of such variations and modifications as come within the scope of the appended claims.

Having described my invention what I claim as new and desire to secure by Letters Patent is:

1. The combination with a wheeled vehicle, of ground engaging means carried by a wheel of said vehicle and arranged to be moved into engagement with the ground; a shaft pivotally mounted on said vehicle; arms carried by said shaft; a bar carried by said arms; guides on the axle of said vehicle for said bar; springs arranged to hold said bar in inoperative position; cam shoes at the ends of said bar and arranged to be thrown into the path of said ground engaging means for operation thereof as they pass the ground; and means for rotating said shaft, substantially as described.

2. The combination with a wheeled vehicle, of radial guide rods arranged between the spokes of the rear wheels of said vehicle; ground engaging dogs slidable on said rods; springs arranged to hold said dogs in retracted positions; hangers secured to the springs of said vehicle; a shaft pivoted in said hangers; arms carried by said shaft; a bar carried by said arms; guides on the axle of said vehicle for said bar; springs arranged to hold said bar in inoperative position; cam shoes at the ends of said bar and arranged to be thrown into the path of said dogs for operation thereof as they pass the ground; and means for rotating said shaft, substantially as described.

3. The combination with a wheeled vehicle, of radial guide rods arranged between the spokes of the rear wheels of said vehicle; ground engaging dogs slidable on said rods; springs arranged to hold said dogs in retracted positions; hangers secured to the springs of said vehicle; a shaft pivoted in said hangers; arms carried by said shaft; a bar carried by said arms; guides on the axle of said vehicle for said bar; springs arranged to hold said bar in inoperative position; cam shoes at the ends of said bar and arranged to be thrown into the path of said dogs for operation thereof as they pass the ground; an arm for oscillating said shaft; an operative lever on the body of said vehicle; and an operative connection between said lever and said oscillating arm, substantially as described.

In testimony whereof I have signed my name to this specification in the presence of two subscribing witnesses.

JOSEPH TOREN.

Witnesses:
    JOSHUA R. H. POTTS,
    ARTHUR A. OLSON.

---

Copies of this patent may be obtained for five cents each, by addressing the "Commissioner of Patents, Washington, D. C."